(12) United States Patent
Brunneke

(10) Patent No.: US 7,661,902 B2
(45) Date of Patent: Feb. 16, 2010

(54) BALL AND SOCKET JOINT

(75) Inventor: Hans-Gerd Brunneke, Osnabrück (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 78 days.

(21) Appl. No.: 11/994,192

(22) PCT Filed: Jun. 19, 2006

(86) PCT No.: PCT/DE2006/001047
§ 371 (c)(1),
(2), (4) Date: Dec. 28, 2007

(87) PCT Pub. No.: WO2007/000138
PCT Pub. Date: Jan. 4, 2007

(65) Prior Publication Data
US 2008/0249630 A1    Oct. 9, 2008

(30) Foreign Application Priority Data
Jun. 29, 2005    (DE) .................. 10 2005 030 747

(51) Int. Cl.
*F16C 11/08*    (2006.01)
(52) U.S. Cl. .................. 403/141; 403/142; 403/143

(58) Field of Classification Search ................. 403/132, 403/133, 135, 140, 141, 142, 143
See application file for complete search history.

(56) References Cited

U.S. PATENT DOCUMENTS

| 2,417,160 | A |   | 3/1947  | Graham          |         |
|-----------|---|---|---------|-----------------|---------|
| 2,471,672 | A | * | 5/1949  | Booth           | 403/132 |
| 3,004,786 | A | * | 10/1961 | Herbenar        | 403/140 |
| 3,007,728 | A |   | 11/1961 | Hoffman         |         |
| 5,813,789 | A | * | 9/1998  | Prickler et al. | 403/135 |
| 6,086,257 | A | * | 7/2000  | Lee             | 384/279 |
| 2003/0180089 | A1 | * | 9/2003 | Heuser et al. | 403/135 |

FOREIGN PATENT DOCUMENTS

| DE | 197 56 756 C1 | 7/1999 |
| DE | 101 49 995 A1 | 4/2003 |
| DE | 103 29 804 A1 | 2/2005 |
| EP | 0 778 421 A1  | 6/1997 |

* cited by examiner

*Primary Examiner*—Michael P Ferguson
(74) *Attorney, Agent, or Firm*—McGlew and Tuttle, P.C.

(57) ABSTRACT

A ball and socket joint has high stability of the bearing shell and hence of the joint and reduces the transmitted structure-borne noise from the viewpoint of increased comfort with a bearing shell design with at least two layers. The inner layer is formed of a metal and the outer layer of a plastic such as polyoxymethylene.

18 Claims, 2 Drawing Sheets

BALL AND SOCKET JOINT

CROSS REFERENCE TO RELATED APPLICATIONS

This application is a United States National Phase application of International Application PCT/DE 2006/001047 and claims the benefit of priority under 35 U.S.C. § 119 of German Patent Application DE 10 2005 030 747.7 filed Jun. 29, 2005, the entire contents of which are incorporated herein by reference.

FIELD OF THE INVENTION

The present invention pertains to a ball and socket joint. It pertains, in particular, to the special embodiment of the ball shell or bearing shell of such a ball and socket joint for reducing sound transmission.

BACKGROUND OF THE INVENTION

Ball and socket joints transmit and absorb forces from a plurality of directions. They are used in automotive engineering, for example, in the area of the steering or track rod. Ball and socket joints of this class comprise a ball pivot, i.e., a bolt with a ball formed at an axial end, a bearing shell accommodating the ball and a housing accommodating the bearing shell and parts of the ball pivot. The ball of the ball pivot slides within the prestressed, permanently lubricated bearing shell, which is protected by the housing against moisture and dirt as well as against the escape of lubricant. In the case of use in a motor vehicle, especially the inner surfaces of the bearing shell accommodating the ball are exposed to high loads. The bearing shells are therefore manufactured, as a rule, from a metal. However, steadily increasing requirements are also imposed on comfort in modern automotive engineering, which can sometimes be met by ball and socket joints with a metallic bearing shell only insufficiently. One drawback is that structure-borne noise is transmitted from the chassis to the passenger compartment or released into the environment to an undesired extent by ball and socket joints with a metallic shell. Ball and socket joints with a plastic shell offer considerable advantages in respect to the transmission of structure-borne noise. Such joints can also meet the requirements concerning loadability in many cases if modern plastics are used. However, their drawback is that their emergency running properties are considerably limited, i.e., total failure of the ball and socket joint can be observed within a short time in case of a defect or failure of the housing seal of a corresponding ball and socket joint, as a consequence of which dirt enters the joint or the lubricant escapes from the bearing site proper, i.e., from the intermediate space between surfaces of the ball of the ball pivot and the bearing shell, which surfaces slide on one another.

A ball and socket joint with a non-metallic bearing shell, in which the bearing shell has a two-layer design, has become known from DE 103 29 804 A1. According to the solution described in that document, the two layers forming the shell have different moduli of elasticity, the outer layer located away from the ball consisting of an elastically springable material and the inner layer located close to the ball consisting of a material with a wear-resistant surface. However, aside from the reference that the bearing shell consists of a non-metallic material, no concrete data are specified concerning the materials of the two layers forming the bearing shell. It can therefore be assumed here from a manufacturing technological point of view that both layers consist of a plastic, but the plastics have different moduli of elasticity and surface strengths, because such layers consisting of different plastics can be manufactured in a two-stage injection molding process and connected to one another in a favorable manner. The requirement that the structure-borne noise be reduced is certainly also met with the use of a corresponding plastic for the inner layer for many applications. However, the problem of insufficient emergency running properties is certainly present with this solution as well, because, unlike in the case of metals, dirt, which can be observed, for example, when leaks develop in ball and socket joints in the area of the running surfaces, tend to dig into the material surface to a certain extent in the case of plastics and materials comparable to plastics. At any rate, metals thus have emergency running properties that can hardly be attained by plastics.

SUMMARY OF THE INVENTION

The object of the present invention is therefore to provide a ball and socket joint, which meets the increasing requirements imposed in terms of comfort, especially the reduction of the transmission of structure-borne noise, on the one hand, and possesses good emergency running properties, besides high loadability for the forces introduced into the joint, on the other hand.

The ball and socket joint according to the invention accomplishes the object. The ball and socket joint comprises a joint housing, which is open on one side, a pivot pin with a joint ball, which is formed at one of the ends, and a spherical bearing shell, which is likewise open on one side. The joint ball of the pivot pin is accommodated by the joint housing, and the bearing shell, which has permanent lubrication on its inner surface, is arranged between the joint ball and the joint housing, as a result of which a sliding surface is formed for the joint ball. The joint housing is closed by a closing ring and sealed by a sealing bellows to prevent the penetration of dirt and the escape of the lubricant in the area of the transition between the joint ball and the shaft of the pivot pin. The shaft protrudes from the joint housing. The bearing shell is formed by at least two layers. The inner layer of the bearing shell according to the present invention is metallic and the outer layer is plastic. High wear resistance of the ball and socket joint is achieved due to this design, and the ball and socket joint has, moreover, good emergency running properties because of the metallic inner surface of its bearing shell. On the other hand, a marked reduction of the transmission of structure-borne noise is achieved compared with ball and socket joints with a purely metallic bearing shell due to the outer plastic layer of the bearing shell.

If the bearing shell of the ball and socket joint according to the present invention is made, as is preferred, of two layers, the outer, absorbing plastic layer used to uncouple sound is preferably injected on the metallic inner layer of the bearing shell. However, it is conceivable that the inner metallic layer and the outer plastic layer are connected to one another by a bonded connection.

Corresponding to an especially advantageous variant of the present invention, the bearing shell has a two-part design. The two parts of the bearing shell, which comprise two or more layers each, are connected to one another via a web acting as a hinge. The mounting of the ball and socket joint, i.e., the fitting together of its components, is simplified by this form of embodiment. The joint ball can be easily inserted into the bearing shell even in case of a thick metallic cover between the joint housing and the joint ball, as it is desirable and is embodied in this embodiment. This is quasi folded up for this and closed after the insertion of the joint ball. Higher resistance to tearing out results for the pivot pin from the increased metallic coverage, so that a higher tensile load is possible for the joints.

The bearing shell, which is open on one side, is preferably divided into two axially symmetrical halves. These are formed, according to a practical embodiment, by two deep-drawn, metallic half shells, which are covered by a plastic layer on their outer circumference and are connected to one another by a web. The edges of the half shells located next to each other within the joint housing close a round opening on the open side of the bearing shell, while the symmetry axis dividing the bearing shell extends at right angles through the diameter of this round opening.

A collar web extending circumferentially on the circumference of the bearing shell is arranged in parallel to the edge of the opening of the bearing shell in a likewise advantageous variant of the ball and socket joint according to the present invention. The bearing shell arranged in the joint housing is fixed in the joint housing and secured against twisting by this collar web. which is pressed in between the closing ring and the joint housing.

The inner metallic layer of the bearing shell has, preferably on its surface facing the joint ball, at least one groove, which forms a reservoir for a lubricant.

To increase the wear resistance even more, the surface of the inner metallic layer of the bearing shell, which surface faces the joint ball, may be chromium-plated or additionally hardened. A QP treatment, i.e., nitriding of the metallic inner surface of the bearing shell, advantageously also leads to an improvement of wear resistance.

For example, polyoxymethylene (POM) or polyamide (PA) or polyether ether ketone (PEEK) may be considered for use as plastics for the outer layer of the bearing shell of the ball and socket joint designed according to the present invention.

The present invention shall be explained in more detail below once again on the basis of an exemplary embodiment. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
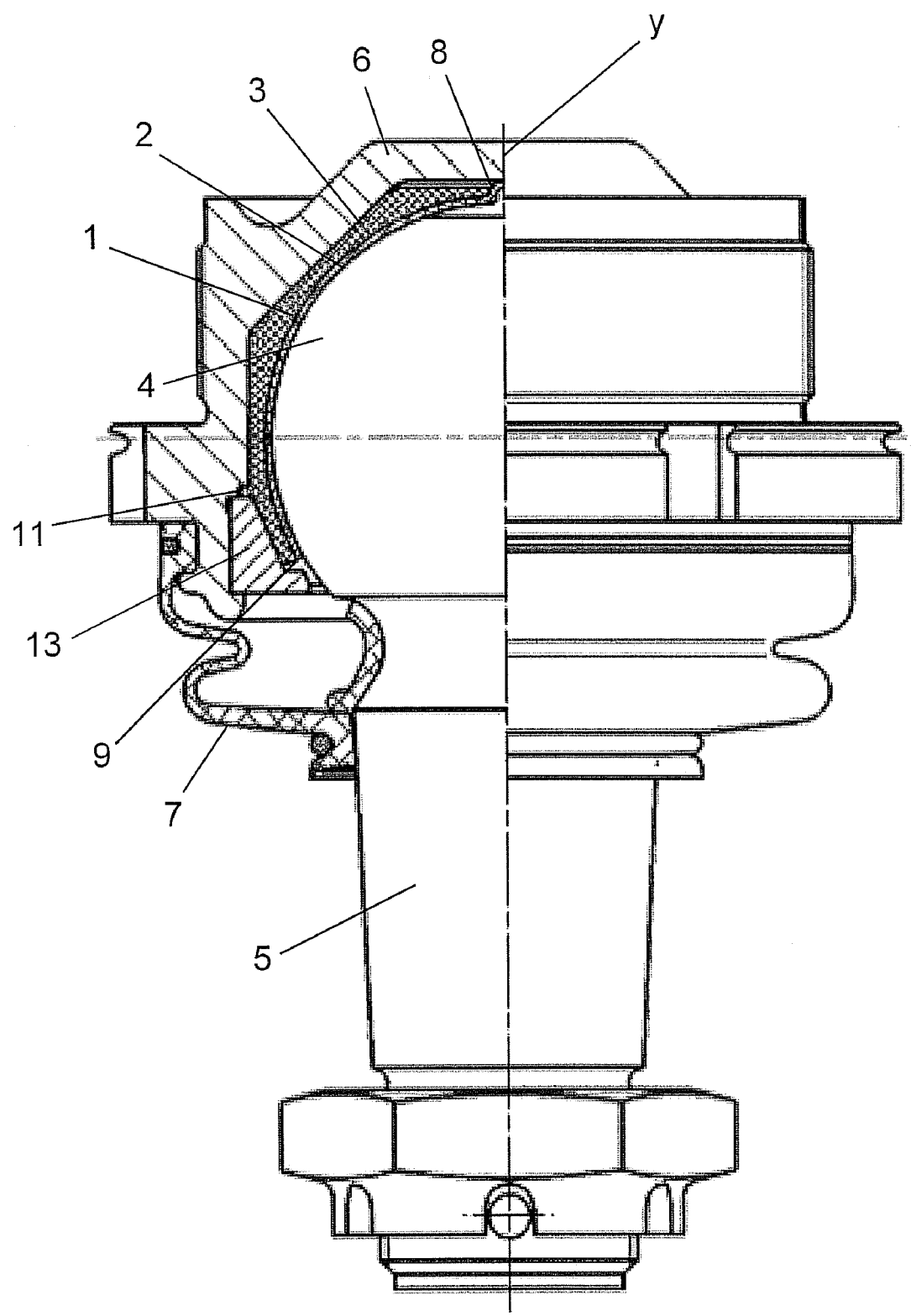
FIG. 1 is an axial half-section of a ball and socket joint designed according to the present invention.

Referring to the drawings in particular, FIG. 1 shows a possible embodiment of a ball and socket joint designed according to the present invention in a half-section. The ball and socket joint comprises essentially the pivot pin 4, 5, the bearing shell 1, 1', the joint housing 6 and a sealing bellows 7. The joint ball 4 of the pivot pin 4, 5 is accommodated by the joint housing 6, which is open on one side. The permanently lubricated and spherically shaped bearing shell 1, 1', which is likewise open on one side and whose inner surface forms the sliding surface for the joint ball of the pivot pin, is arranged between the joint housing 6 and the joint ball 4. The bearing shell 1, 1' has a two-layer design. Corresponding to the present invention, the inner layer 2 consists of a metal, while the outer layer 3 consists of a plastic.

High stability of the ball and socket joint is guaranteed by the metallic inner layer 2 of the bearing shell 1, 1'. Compared to ball and socket joints whose bearing shell consists exclusively of non-metallic materials, i.e., usually plastic, the ball and socket joint designed according to the present invention possesses, moreover, improved emergency running properties. Leaks that may occur in the sealing bellows, as a consequence of which dirt penetrates into the joint or lubricant escapes from the bearing site thereof, do not lead, as a result, to rapid destruction of the ball and socket joint, unlike in the case of ball and socket joints with a plastic bearing shell. The risk of dirt particles digging into the running surface of the bearing shell 1, 1' is reduced compared to bearing shells made of plastic.

The bearing shell 1, 1' has a two-part design in the embodiment shown in FIG. 1. It comprises two axially symmetrical halves, which are connected to one another via a connecting web 8 acting as a hinge. The mounting of the ball and socket joint is simplified as a result. In addition, a collar web 11, which extends over the circumference of the bearing shell 1, 1' and is pressed in between the closing ring 13 and the joint housing 6, is formed in the lower area of the bearing shell 1, 1'. The bearing shell 1, 1' is fixed in the joint housing 6 during mounting by the collar web 11 arranged in parallel to the edge 9, 9' of the opening of the bearing shell and thus secured against accidental twisting during the use of the ball and socket joint as intended.

The surface of the inner metallic surface 2 of the bearing shell 1, 1' is, for example, hardened or QP-treated, i.e., nitrided, in order to further increase its wear resistance. Its outer layer 3 consists, for example, of POM (polyoxymethylene). The vibrations, especially the structure-borne noise, which are transmitted from the pivot pin 4, 5 via the bearing shell 1, 1' to the joint housing 6, are advantageously absorbed due to the elasticity of this material. Due to the design of the bearing shell 1, 1' according to the present invention, the ball and socket joint thus outstandingly combines the meeting of the requirements imposed in terms of its loadability with the meeting of the requirements existing concerning comfort. The outer layer 3 of the bearing shell 1, 1', consisting of a plastic, is applied to the inner metallic surface 2 preferably by injection. However, preliminary tests have shown that it could also be possible to bond the outer layer 3 to the inner one.

Figure 2:
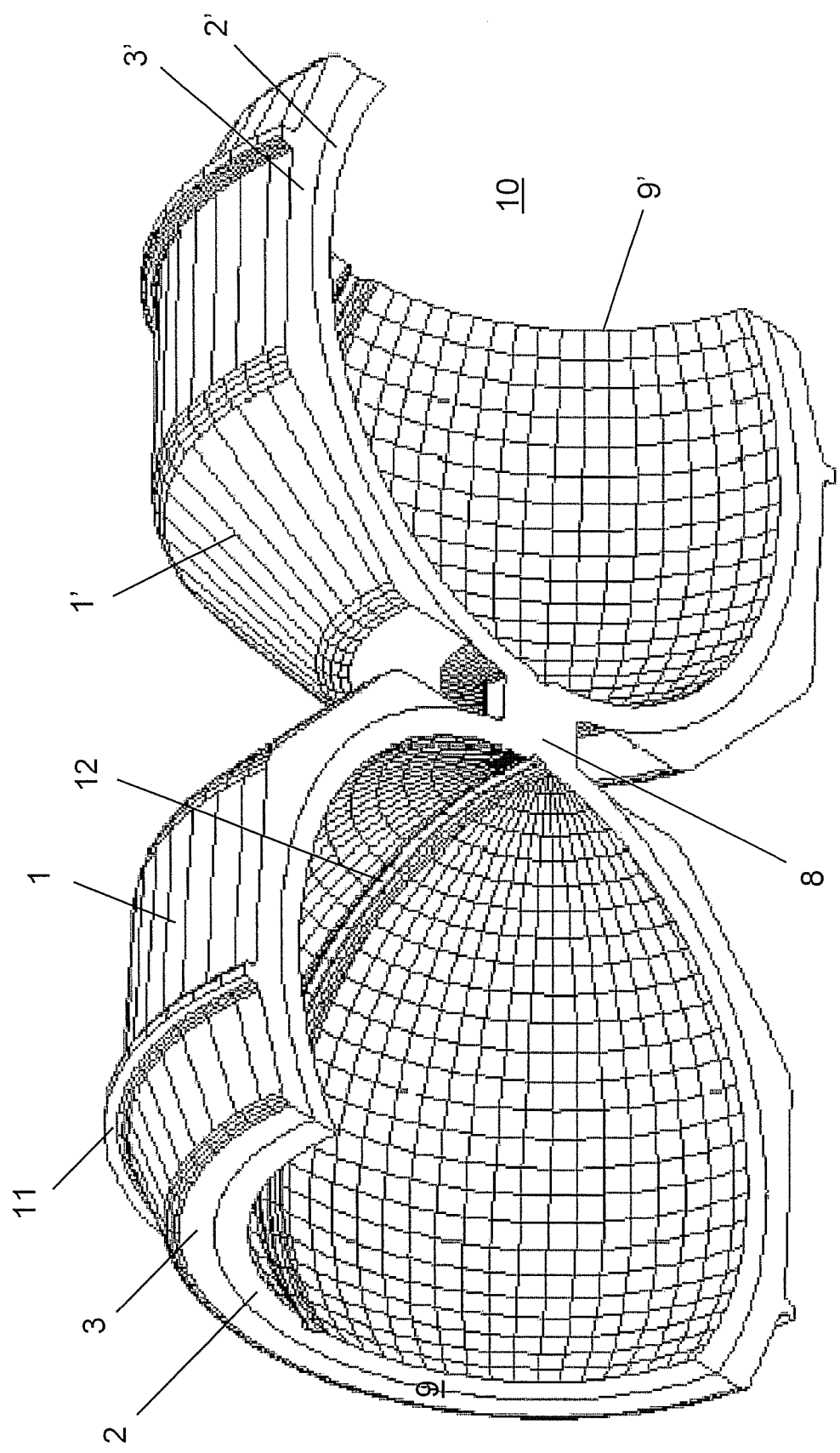
FIG. 2 is an isometric view of the bearing shell of the ball and socket joint according to FIG. 1.

FIG. 2 shows the bearing shell 1, 1' designed according to the present invention in a two-part design once again in an isometric view. As can be recognized, both half shells are of a two-layer design and are connected to one another via web 8, which acts as a hinge. The collar web 11 already mentioned, which extends circumferentially over the circumference of the bearing shell, can also be recognized in the view. Moreover, it can be seen that a groove 12 is milled into the metallic inner surface of the bearing shell 1, 1'. A grease reservoir is formed by this groove 12 for the permanent lubrication of the joint.

While specific embodiments of the invention have been shown and described in detail to illustrate the application of the principles of the invention, it will be understood that the invention may be embodied otherwise without departing from such principles.

The invention claimed is:
1. A ball and socket joint comprising:
a joint housing with an opening on one axial side;

a pivot pin with a shaft and a joint ball formed at one end thereof, said joint ball being accommodated by said joint housing and said shaft protruding from said joint housing;

a bearing shell with an essentially spherical inner surface, said bearing shell being arranged between said joint housing and said joint ball, said bearing shell having an opening on one side and having a permanently lubricated inner wall, said bearing shell comprising at least two layers including an inner metallic layer consisting essentially of metal and an outer plastic layer consisting essentially of a plastic, wherein said bearing shell is divided into two cirumferential parts, wherein said two parts of said bearing shell each comprise said at least two layers and are connected to one another via a web forming a hinge located opposite said bearing shell opening, wherein said inner surface of said bearing shell has at least one groove axially extending between said web and said bearing shell opening, which forms a reservoir for a lubricant, on said inner surface facing said joint ball;

a closing ring cooperating with said housing for closing said opening of said housing in a region adjacent to said opening of said bearing shell; and a sealing bellows closing and sealing said opening of said joint housing in an area of a transition between said joint ball and said shaft of said pivot pin.

2. A ball and socket joint in accordance with claim 1, wherein said inner metallic layer and said outer plastic layer are connected to one another by a bonded connection.

3. A ball and socket joint in accordance with claim 1, wherein said inner metallic layer in each of said two parts has a metallic portion extending in an upward axial direction, said metallic portion in one of said two parts being connected with said metallic portion in another one of said two parts to form said web.

4. A ball and socket joint in accordance with claim 1, wherein said bearing shell is divided into two axially symmetrical halves, which are formed by two deep-drawn, metallic half shells, which are covered by a plastic layer on their outer circumference and are connected to one another by said web, wherein edges of said half shells located next to each other within said joint housing define said opening of said bearing shell as a round opening and a symmetry axis divides said bearing shell and extends at right angles through a diameter of said round opening.

5. A ball and socket joint in accordance with claim 1, wherein said bearing shell includes a collar web extending circumferentially and arranged substantially in parallel to an edge of said opening of said bearing shell, said collar web being pressed in between said closing ring and said joint housing whereby said bearing shell arranged in said joint housing is fixed and secured against twisting.

6. A ball and socket joint in accordance with claim 1, wherein said inner surface of said bearing shell is a surface of said inner metallic layer, which said surface faces said joint ball, and is chromium-plated to increase a wear resistance thereof.

7. A ball and socket joint in accordance with claim 1, wherein said inner surface of said bearing shell is a surface of said inner metallic layer, which said surface faces said joint ball, and is hardened to increase a wear resistance thereof.

8. A ball and socket joint in accordance with claim 1, wherein said inner surface of said bearing shell is a surface of said inner metallic layer, which said surface faces said joint ball and is nitrided to increase a wear resistance thereof.

9. A ball and socket joint in accordance with claim 1, wherein said outer layer of said bearing shell consists essentially of polyoxymethylene.

10. A ball and socket joint in accordance with claim 1, wherein said outer layer of said bearing shell consists essentially of polyamide.

11. A ball and socket joint in accordance with claim 1, wherein said outer layer of said bearing shell consists essentially of polyether ether ketone.

12. A ball and socket joint comprising:

a joint housing with an inner surface defining an interior space with a housing opening;

a pivot pin with a shaft and a joint ball formed at one end thereof, said joint ball being accommodated by said joint housing and said shaft protruding from said joint housing opening, said joint ball having a joint ball top surface;

a bearing shell arranged between said joint housing and said joint ball, said bearing shell having a shell opening at one axial end and having an inner surface with lubricant thereon, said bearing shell comprising an inner metallic layer facing said joint ball to define said inner surface and an outer plastic layer facing said housing inner surface, said inner metallic layer having an outer metallic surface, said outer plastic layer engaging said outer metallic surface, said bearing shell comprising a first circumferential bearing shell portion, a second circumferential bearing shell portion and a web forming a hinge located opposite said shell opening, each of said first bearing shell portion and said second bearing shell portion comprising said inner metallic layer and said outer plastic layer, said first bearing shell portion being connected to said second bearing shell portion via said web, said web being located opposite said joint ball top surface, wherein said inner surface of said bearing shell has at least one groove axially extending between said web and said shell opening, which forms a reservoir for the lubricant, on said inner surface facing said joint ball;

a closing ring cooperating with said housing and said bearing shell for closing said opening of said housing in a region adjacent to said shell opening; and a sealing bellows connected to said housing and an area of a transition between said joint ball and said shaft of said pivot pin.

13. A ball and socket joint in accordance with claim 12, wherein said inner metallic layer and said outer plastic layer are connected to one another by a bond connection, wherein said inner metallic layer of each of said first bearing shell portion and said second bearing shell has a web connecting portion extending in an upward axial direction, said web connecting said web connecting portion of said inner metallic layer in said first bearing shell portion with said web connecting portion of said inner metallic layer in said second bearing shell portion.

14. A ball and socket joint in accordance with claim 12, wherein said bearing shell is divided into two axially symmetrical halves, which are formed by two deep-drawn, metallic half shells, which are covered by a plastic layer on their outer circumference and are connected to one another by said web, wherein edges of said half shells located next to each other within said joint housing define said shell opening of said bearing shell as a round opening and a symmetry axis divides said bearing shell and extends at right angles through a diameter of said round opening.

15. A ball and socket joint in accordance with claim 12, wherein said bearing shell includes a collar web extending circumferentially and arranged substantially in parallel to an edge of said opening of said bearing shell, said collar web being pressed in between said closing ring and said joint housing whereby said bearing shell arranged in said joint housing is fixed and secured against twisting.

16. A ball and socket joint in accordance with claim 12, wherein said inner surface of said inner metallic layer includes a wear resistance increasing feature including at least one of chromium-plating, hardening and nitriding of the metallic layer.

17. A ball and socket joint in accordance with claim 12, wherein said outer layer of said bearing shell consists essentially of at least one of polyoxymethylene, polyamide and polyether ether ketone.

18. A ball and socket joint comprising:
a joint housing with an inner surface defining an interior space with a housing opening;
a pivot pin with a shaft and a joint ball formed at one end thereof, said joint ball being accommodated by said joint housing and said shaft protruding from said joint housing opening;
a bearing shell with an inner surface and a shell opening on one axial side, said bearing shell comprising a first circumferential bearing shell portion and a second circumferential bearing shell portion, said first bearing shell portion having a first inner metallic layer and a first outer plastic layer, said first inner metallic layer having an outer first inner metallic layer surface, said first outer plastic layer engaging said outer first inner metallic layer surface, said second bearing shell portion having a second inner metallic layer and a second outer plastic layer, said second inner metallic layer having an outer second inner metallic layer surface, said second outer plastic layer engaging said outer second inner metallic layer surface, said first inner metallic layer having a first metallic upward axial extending portion, said second inner metallic layer having a second metallic upward axial extending portion, said first inner metallic layer engaging said second inner metallic layer to form a continuous inner metallic layer, said continuous inner metallic layer facing said joint ball to define said inner surface, said first outer plastic layer engaging said second outer plastic layer to form a continuous outer plastic layer, said continuous outer plastic layer facing said housing inner surface, said first metallic upward extending portion being integrally connected with said second metallic upward extending portion to form a continuous web structure, said continuous web structure forming a hinge located opposite said shell opening, said bearing shell being arranged between said joint housing and said joint ball, said inner surface of said bearing shell having lubricant thereon;
a closing ring cooperating with said housing and said bearing shell for closing said opening of said housing in a region adjacent to said shell opening; and
a sealing bellows connected to said housing and an area of a transition between said joint ball and said shaft of said pivot pin.

* * * * *